United States Patent [19]
Li

[11] Patent Number: 5,926,298
[45] Date of Patent: Jul. 20, 1999

[54] OPTICAL MULTIPLEXER/DEMULTIPLEXER HAVING A BROADCAST PORT

[75] Inventor: Yuan P. Li, Duluth, Ga.

[73] Assignee: Lucent Technologies Inc., Murray Hill, N.J.

[21] Appl. No.: 08/709,240

[22] Filed: Aug. 30, 1996

[51] Int. Cl.[6] .................................................. H04B 10/20
[52] U.S. Cl. .............................. 359/120; 385/24; 385/27; 385/43
[58] Field of Search ................................ 359/120, 121, 359/124, 127, 130, 177, 178; 385/24, 27, 31, 37, 43, 46

[56] References Cited

U.S. PATENT DOCUMENTS

| | | | |
|---|---|---|---|
| 4,902,086 | 2/1990 | Henry et al. | 350/96.12 |
| 4,953,935 | 9/1990 | Suchoski, Jr. et al. | 359/120 |
| 5,002,350 | 3/1991 | Dragone | 350/96.15 |
| 5,039,993 | 8/1991 | Dragone | 343/776 |
| 5,136,671 | 8/1992 | Dragone | 385/46 |
| 5,243,672 | 9/1993 | Dragone | 385/46 |
| 5,321,541 | 6/1994 | Cohen | 359/127 |
| 5,412,744 | 5/1995 | Dragone | 385/24 |
| 5,434,942 | 7/1995 | Jackel et al. | 385/43 |
| 5,440,416 | 8/1995 | Cohen et al. | 359/127 |
| 5,537,671 | 7/1996 | Toyama et al. | 385/27 |
| 5,568,579 | 10/1996 | Okaniwa | 385/43 |
| 5,579,421 | 11/1996 | Duvall et al. | 385/24 |
| 5,629,999 | 5/1997 | Henry et al. | 385/43 |
| 5,706,377 | 1/1998 | Li | 385/24 |
| 5,729,643 | 3/1998 | Hmelar | 385/43 |

FOREIGN PATENT DOCUMENTS

0639782   1/1994   European Pat. Off. .

Primary Examiner—Jeffery A. Hofsass
Assistant Examiner—John Tweel, Jr.
Attorney, Agent, or Firm—Michael A. Morra

[57] ABSTRACT

An optical multiplexer/demultiplexer 500 comprises first and second star couplers 41, 42 that are interconnected by a number of optical waveguides 430 of unequal length (i.e., a grating). The multiplexer/demultiplexer functions to distribute optical signals in a first-wavelength region $\lambda_A$ (around 1550 nm) from one input port 401 of the first star coupler 41 to individual output ports 426 of the second star coupler 42 according to wavelength. The first star coupler includes at least one other input port 402 for receiving optical signals in a second wavelength region $\lambda_B$ (around 1310 nm) to be broadcast to all output ports of the second star coupler. In order to properly broadcast the optical signals in the second wavelength region, a power splitter 50 is connected in series with the other input port(s) of the first star coupler. The combined width $w_1$ of the output port(s) of the power splitter is greater than the width $w_2$ subtended by the central Brillouin zone of the multiplexer/demultiplexer. In one embodiment of the invention, the power splitter comprises a star coupler 50-1 having one input port 51 and many output ports; while in another embodiment, the power splitter comprises a tapered waveguide 50-2. A particularly useful device 100 is formed by adding a coarse WDM (80) to route optical input signals in the $\lambda_A$ wavelength region to the one input port of the first star coupler, and to route optical signals in the $\lambda_B$ wavelength region to the power splitter.

17 Claims, 5 Drawing Sheets

OPTICAL MULTIPLEXER/DEMULTIPLEXER HAVING A BROADCAST PORT

TECHNICAL FIELD

This invention relates to optical fiber communication networks, and more particularly to those networks that include passive components for routing and distributing optical signals.

BACKGROUND OF THE INVENTION

Optical fiber networks are increasingly important for the distribution of voice, video, and data signals. Such systems generally involve a number of feeder fibers that emanate from a headend office, and terminate at respective remote terminals. In a Fiber-To-The-Home or a Fiber-To-The-Curb system, optical signals are transmitted from each of these remote terminals to a number of optical network units (ONUs) over distribution fiber. Signals are transmitted optically or electrically to each ONU.

Network architectures have been proposed for transmitting signals between the headend office and the ONUs. One popular architecture uses a passive optical branching device to exchange signals between the feeder and distribution fibers, and this is particularly desirable because power is not required. Among the branching devices that are available, one in particular has emerged as potentially the most useful of all. This device combines signal broadcasting with signal distribution, and is symbolically and functionally shown in FIG. 1. Because each function is generally handled by a separate passive optical network (PON), this device has become known to as "2-PONs-In-1," or 2P1 for short. Simply stated, the 2P1 device overlays a power splitter (PS) PON and a wavelength-division multiplexer (WDM) PON on the same optical integrated circuit. The WDM PON can be used to send private signals to each subscriber, while the PS PON can be used simultaneously to broadcast signals. Alternatively, in a single-fiber bi-directional network, the WDM PON can be used for downstream, and the PS PON for upstream. In addition, the network can be initially deployed as a public broadcast network using the PS PON, and upgraded at a later time to a private distribution network using the WDM PON without changing outside plant. Furthermore, in a power splitting network using the 2P1 device, the WDM overlay can be used for "lit"-fiber testing (i.e., testing a particular fiber at one wavelength without disturbing active signal transmission at a different wavelength).

Optical multiplexing and demultiplexing have been accomplished in the past via a pair of star couplers that are interconnected by an optical grating (i.e., a number of waveguides—each differing in length with respect to its nearest neighbor by a predetermined fixed amount). Such structures are frequently referred to as dense WDMs, which separate optical transmission into many narrow wavelength bands (channels)—as contrasted with coarse WDMs, which separate optical transmission into two relatively wide channels. Examples of dense WDMs that use interconnected star couplers are shown in U.S. Pat. Nos. 5,002,350 and 5,136,671. In one direction of optical transmission, the dense WDM can be used as a multiplexer wherein a plurality of separate and distinct wavelengths ($\lambda_1, \lambda_2, \ldots \lambda_n$) are launched into different input ports of one star coupler and emerge on a single output port of the other star coupler. In the other direction of optical transmission, the dense WDM can be used as a demultiplexer wherein a plurality of different wavelengths are launched into a single port of one star coupler and emerge on multiple ports of the other star coupler according to their particular wavelengths. Accordingly, dense WDMs are often referred to wavelength routing devices, and the wavelength region (band) that is routed to/from a particular port is referred to as a channel.

U.S. Pat. No. 5,412,744 discloses a dense WDM having a power splitter connected in series with the input ports of the dense WDM. However, this structure is not suitable for use as a 2P1 device because the power splitter disclosed does not broadcast optical power to all of the output channels. Instead, it behaves like another WDM channel, albeit with a wider and flatter passband.

U.S. Pat. No. 5,321,541 discloses a 2P1 device that functions transparently as a dense WDM at 1550 nanometers (where 1 nanometer=1 nm=a billionth of a meter) and as a power splitter at 1310 nm. These two wavelength regions are first separated by a coarse WDM. Thereafter, optical signals in the 1550 nm region are routed around the power splitter, which broadcasts optical signals in the 1310 nm region. These parallel signals are then recombined by coarse WDMs at each output port of the 2P1 device. This particular design is implemented on a single chip using conventional silica waveguide technology; but it requires numerous waveguide crossings and two stages of coarse WDMs that add loss (about 1.5 dB) and crosstalk. This particular design is shown herein as FIG. 3.

U.S. Pat. No. 5,440,416 discloses another 2P1 device based on a dense WDM having reflective waveguides. In one embodiment of this design, the mirror symmetry of a conventional dense WDM is used. A reflective coating is applied at the mirror plane, and only that portion of the WDM on one side of the mirror plane is retained. In another embodiment, the reflective coating is replaced with Bragg reflectors, which are gratings that can be delineated by photolithography. However, the additional processing required is not cost effective because it not only takes additional time, but it also decreases yield if not executed precisely.

Figure 4:
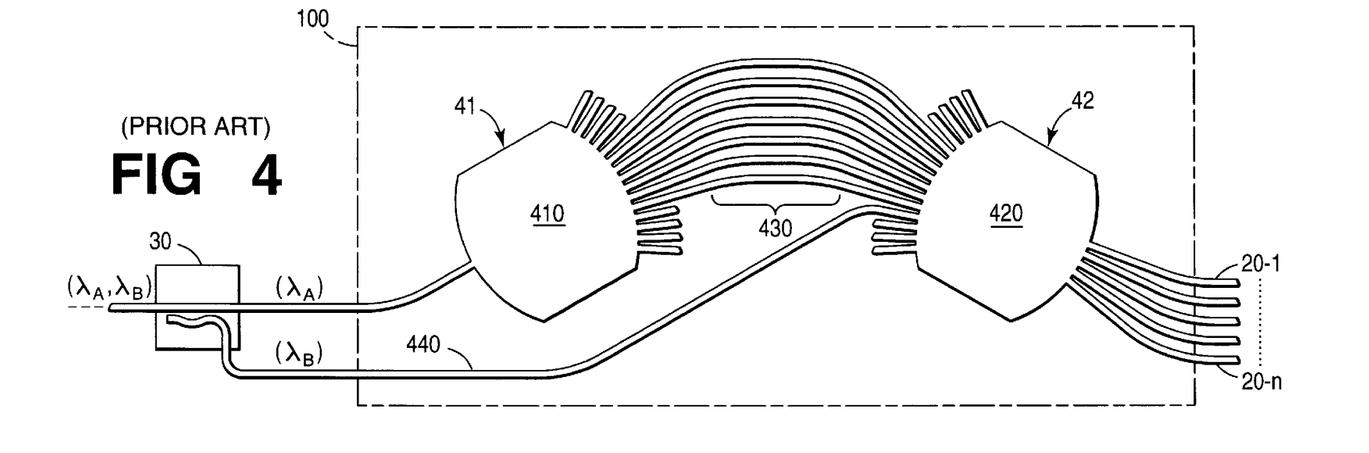
FIG. 4 discloses another prior art optical multiplexer/demultiplexer.

The '416 patent discloses yet another embodiment of a 2P1 device wherein the waveguide carrying the broadcast optical signal (for delivery to all output ports) is connected to the second stage of a dense WDM. However, because an array of waveguides (gratings) must also be connected to the second stage, the broadcast waveguide cannot be properly positioned. Ideally, the broadcast waveguide is positioned at the center of the gratings; but this would either require waveguide crossings at non-optimum angles, or a multi-layer arrangement with increased processing cost. Unfortunately, by positioning the waveguide that carries the optical signals to be broadcast at the end of the grating array, as shown by FIG. 4 herein, optical signal power output is decreased. In other words, coupling efficiency is reduced.

What is desired, and what does not appear to be disclosed in the prior art, is an optical multiplexer/demultiplexer for use in a 2P1 device, but having improved coupling efficiency over the prior art. Moreover, the desired optical multiplexer/demultiplexer should avoid waveguide crossings and multi-layer construction.

SUMMARY OF THE INVENTION

An optical multiplexer/demultiplexer comprises first and second star couplers that are interconnected by a number of optical waveguides of unequal length (grating). The multiplexer/demultiplexer distributes optical signals in a first-wavelength region ($\lambda_A$) from one input port of the first star coupler to individual output ports of the second star coupler according to wavelength. The first star coupler includes at least one other input port for receiving optical signals in a second wavelength region ($\lambda_B$) to be broadcast to all output ports of the second star coupler. However, in order to properly broadcast the optical signals in the second wavelength region, a power splitter is connected in series with other input port(s) of the first star coupler; and the combined width of the output port(s) of the power splitter is greater than the distance subtended by the Brillouin zone of the grating.

In one illustrative embodiment of the invention, the power splitter comprises a star coupler having one input port and many output ports.

In another illustrative embodiment of the invention, the power splitter comprises one input port that tapers to a single, wide output port.

A particularly useful device ("2-PONs-In-1," or 2P1 for short) is formed by adding a coarse WDM to route optical input signals in the $\lambda_A$ wavelength region to the one input port of the first star coupler, and to route optical signals in the $\lambda_B$ wavelength region to the power splitter. In preferred embodiments of the invention, the coarse WDM comprises a Fourier filter, $\lambda_A$ is around 1550 nm, and $\lambda_B$ is around 1310 nm.

BRIEF DESCRIPTION OF THE DRAWING

The invention and its mode of operation will be more clearly understood from the following detailed description when read with the appended drawing in which.

DETAILED DESCRIPTION

Planar Waveguide Construction

The present invention relates to planar waveguides whose construction is generally understood and described in numerous articles and patents. The most advanced and technically developed planar waveguides are doped-silica waveguides fabricated with silicon optical bench (SiOB) technology. A doped silica waveguide is usually preferred because it has a number of attractive properties including low cost, low loss, low birefringence, stability, and compatibility for coupling to fiber. Further, the processing steps are compatible with those in silicon integrated circuit (IC) technology, which are geared for mass production and are readily known.

Generally, a doped-silica waveguide is formed by initially depositing a base or lower cladding layer of low index silica on a silicon or silica substrate. A layer of doped silica with a high refractive index, i.e., the core layer, is then deposited on top of the lower cladding layer. The core layer is subsequently patterned or sculpted into structures required by the optical circuits using photo-lithographic techniques similar to those used in integrated circuit fabrication. Lastly, a top cladding layer is deposited to cover the patterned waveguide core. This technology is generally described, e.g., in U.S. Pat. No. 4,902,086 issued to C. H. Henry et al.

Critical to the performance of any planar optical waveguide are the waveguide dimensions, i.e., the height and width of the waveguide core, and the refractional difference of the refractive index between the core and the cladding of the waveguide, denoted as Δ. The height (H) or thickness of the core is determined by the thickness of the core layer; and the width (W) of the core is determined by the photo-lithographic mask and undercut in chemical etching. The Δ of the waveguide is mostly determined by the material system and the fabrication process. In practice, different waveguide structures and systems are used for different types of functions and tradeoffs are made in the core dimensions and Δ to optimize different aspects of optical performance.

For example, a standard P-doped waveguide typically has a symmetrical square core structure approximately 5 μm wide, a thick lower cladding approximately 15 μm, a thick upper cladding of approximately 15 μm, and a medium Δ≈0.6%. A square-shaped core with equal width and height is chosen mainly because it best emulates a circular optical fiber, and because of the convenience in modeling and mask layout. The dimension of the core is chosen to be as large as possible for strong optical confinement and low propagation loss, but small enough so that the waveguide remains singlemode. However, this waveguide has a considerable mode-field mismatch with a standard singlemode optical fiber that has a low Δ≈0.3% and a core diameter of about 8 μm. The fiber-waveguide-fiber coupling loss with the above-described waveguide is about 0.8 dB at a wavelength of λ=1.3 μm.

Additionally, the crosstalk in a dense WDM, such as used in the present invention and known as a "Dragone router" noting its inventor, is sensitive to random phase errors of the phase grating waveguides. To reduce such errors caused by fluctuations in waveguide width, a waveguide having a Δ≈0.6%, and dimensions of W≈8 μm and H≈3.5 μm is utilized. However, compared to the 5 μm square waveguide, this waveguide structure has even larger mode-field mismatch with the standard fiber, and the couplers are more sensitive to the uncontrolled variations in the waveguide height and width. Optimally integrating these devices onto the same wafer or substrate is disclosed in application Ser. No. 08/547767, which was filed on Oct. 24, 1995 and is hereby incorporated by reference.

2-PONs-In-1 (2P1) Device

As discussed earlier, the term "2P1" derives from the fact that power splitting (PS) and wavelength-division multiplexing (WDM) functions are typically carried out on separate passive optical networks (PONs). However, once the synergy of combining these two functions was appreciated, they were integrated onto a single optical integrated circuit using the above-discussed SiOB technology, and the resulting device has become widely known as a 2-PONs-In-1 (2P1 for short) device.

All of the prior art optical multiplexing and demultiplexing devices that combine wavelength-division multiplexing and broadcasting functions within a single device have done so as a parallel combination of these functions. This was a reasonable approach because the 2P1 device evolved as a way to test channels of a broadcast network individually. To do this, one needed to "go around" the power splitter, which broadcast the same optical signal to N different customers, with a multiplexer for transmitting different wavelengths to each customer. Information to be broadcast was transmitted in a first wavelength region, whereas test signals were all transmitted in second wavelength region that was disjoint from the first wavelength region so that they would not interfere with each other. It is not surprising that the first 2P1 device, which is disclosed in U.S. Pat. No. 5,321,541 (the '541 patent), speaks of "bypass" lines that enable test signals from an Optical Time Domain Reflectometer (OTDR) to go around the power splitter to test individual lines.

By way of contrast, the present invention connects the power splitter in series with the optical multiplexer, and this represents a novel departure from the way one would normally think of having one thing bypass another. Indeed, the very notion of "going-around" or "bypassing" suggests a parallel operation. Consider, for example, express highways that bypass a busy city—they are parallel to the local highways that travel through the city.

Figure 1:
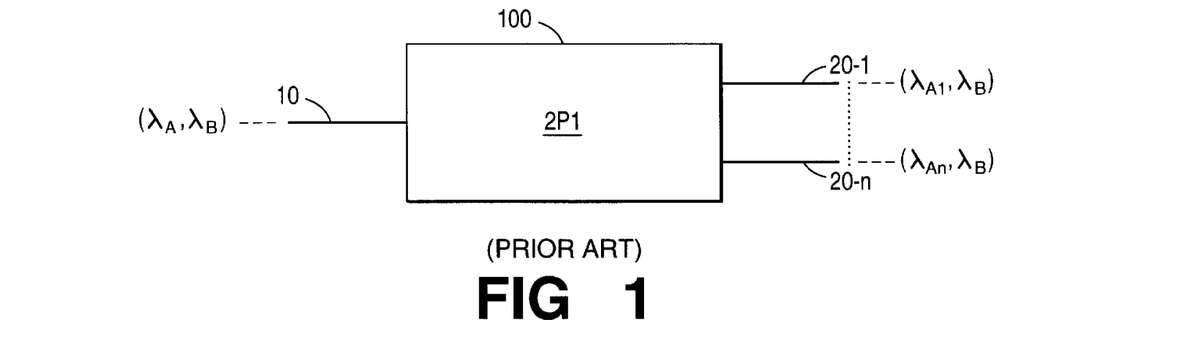
FIG. 1 is a symbolic and functional representation of a prior art, optical multiplexer/demultiplexer that combines wavelength-division multiplexing and broadcasting functions within a single device.
Figure 2:
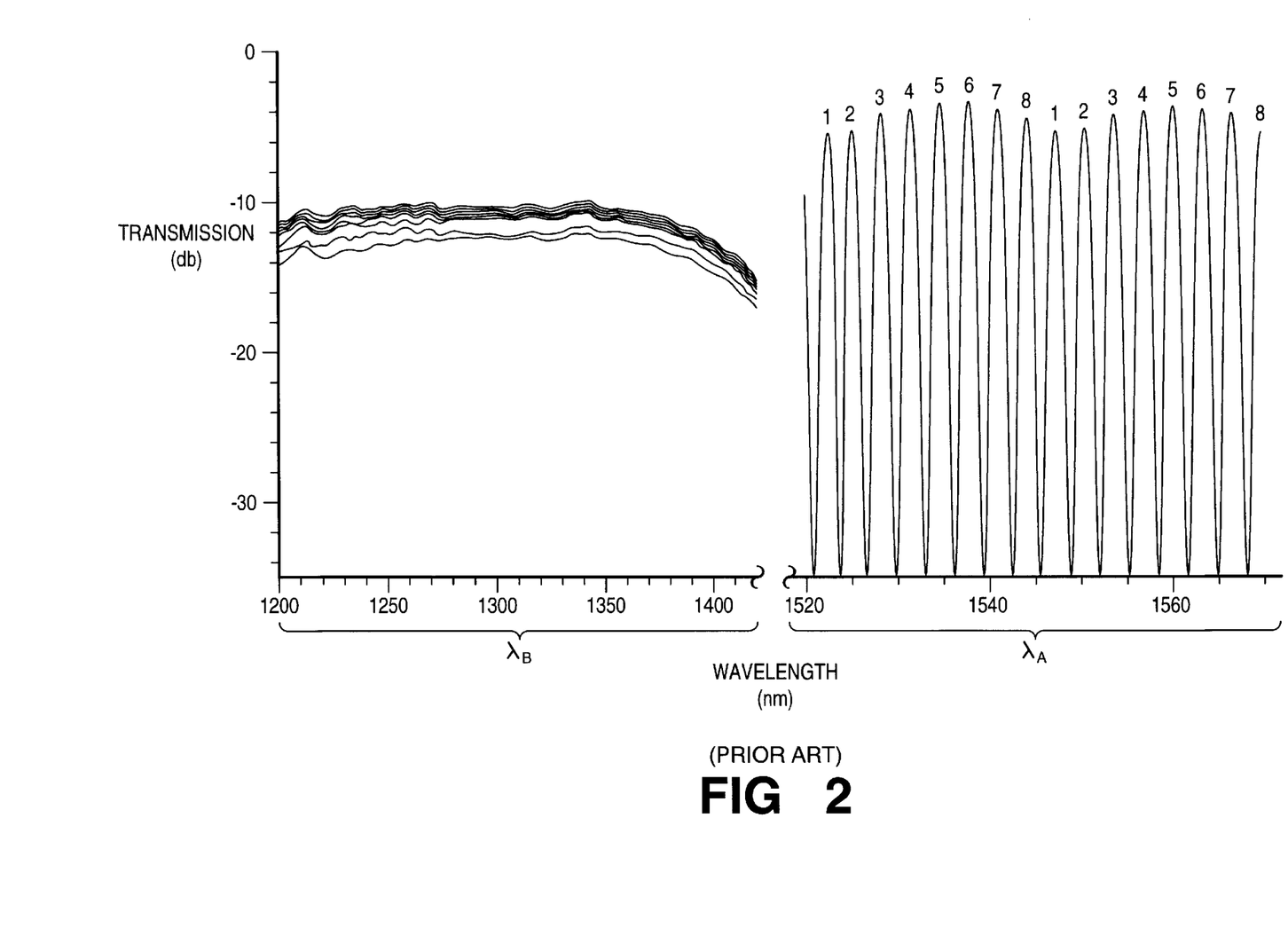
FIG. 2 illustrates the transfer characteristic of an 8-output, optical multiplexer/demultiplexer.

The 2P1 function can be readily understood when reference to FIG. 1, 2 is made. In FIG: 1, optical signals that are launched into input 10 that reside in one wavelength region ($\lambda_A$) are broadcast to each and every output port 20-1 . . . 20-n whereas optical signals that are launched into input 10 that reside in another wavelength region ($\lambda_B$) are routed to output ports 20-1 . . . 20-n according to their specific wavelength—a property which is referred to as demultiplexing. For example, subchannels $\lambda_{A1}$, $\lambda_{A2}$, . . . $\lambda_{An}$, reside within wavelength region $\lambda_A$, and $\lambda_{A1}$ is routed exclusively to output port 20-1 whereas subchannel )$\lambda_{A2}$ is routed exclusively to output port 20-2. FIG. 2 illustrates the transfer characteristic of an 8-output, 2P1 device showing the output signal level for each of 8 outputs as a function of wavelength. Signals in wavelength region $\lambda_B$ (illustratively centered around 1310 nm) are received by each of the eight output ports at approximately the same intensity. On the other hand, signals in wavelength region $\lambda_A$ (illustratively centered around 1550 nm) are routed to each of eight output ports according to wavelength.

Figure 3:
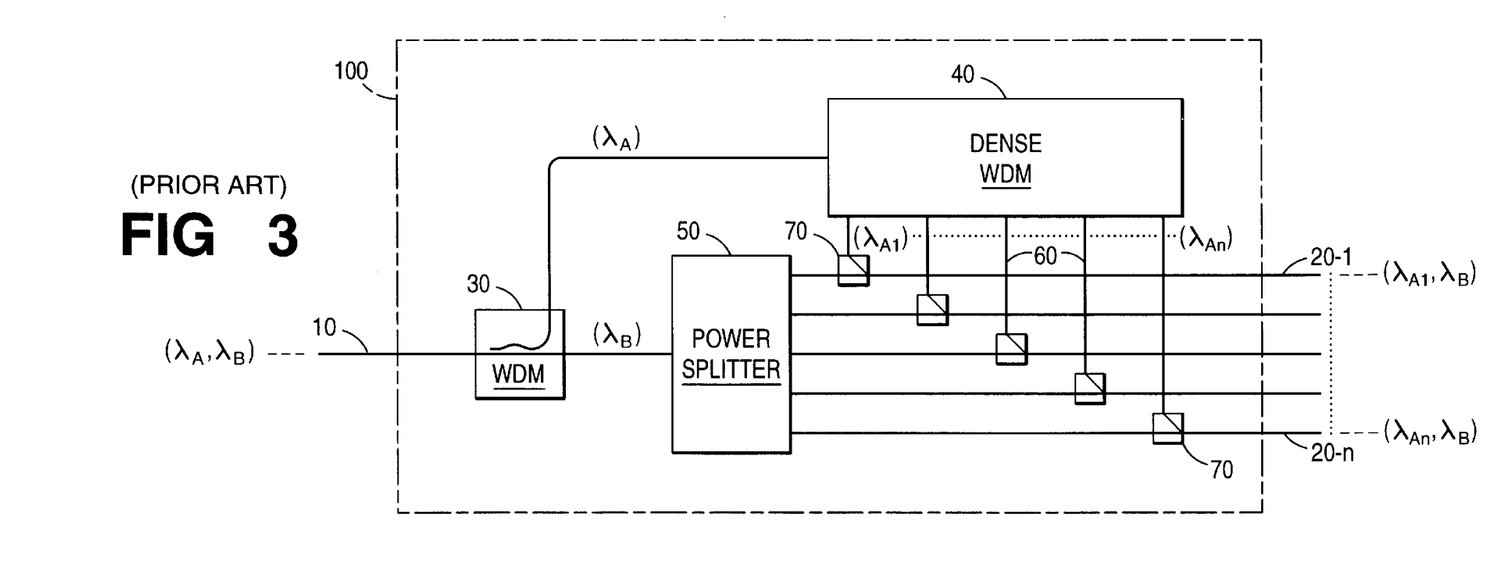
FIG. 3 discloses a more detailed representation of the prior art optical multiplexer/demultiplexer shown in FIG. 1.

Reference is now made to FIG. 3 which discloses a known design for a 2P1 device that is described in the '541 patent and is used for selectively routing optical signals in two disjoint wavelength regions ($\lambda_A$, $\lambda_B$) between input 10 and outputs 20-1 . . . 20-n. Briefly, the design comprises a power splitter 50 which is bypassed by a network that includes: (i) coarse upstream WDM 30, (ii) coarse downstream WDMs 70, (iii) dense WDM 40, and (iv) bypass lines 60. Each coarse WDM separates transmission into two relatively wide wavelength channels. Dense WDM 40 subdivides wavelength region $\lambda_A$ into subchannels ($\lambda_{A1}$, $\lambda_{A2}$, . . . $\lambda_{An}$).Each subchannel has a relatively narrow spectral width, which is typically about 2 nm. Each subchannel is then combined, via coarse WDMs 70, with optical signals emanating from power splitter 50 so that each output 20-1 . . . 20-n includes one particular subchannel from wavelength region $\lambda_A$ and all of wavelength region $\lambda_B$.

Reference is now made to FIG. 4 which shows the prior art 2P1 device 100 disclosed in U.S. Pat. No. 5,440,416. In this device coarse WDM 30 routes the optical signals in the $\lambda_A$ wavelength region toward free-space region 410 of star coupler 41, and the optical signals in the $\lambda_B$ wavelength region toward free-space region 420 of star coupler 42. Note that the signals to be broadcast to all output ports 20-1 . . . 20-n correspond to those in the $\lambda_B$ wavelength region and are present on waveguide 440. Unfortunately, positioning broadcast waveguide 440 at the bottom end of the planar waveguide array (grating) 430 adds about 3 dB of loss. And positioning the broadcast waveguide 440 at the center of grating 430 is extremely difficult. For example, assuming that all waveguides 430, 440 are disposed in the same plane, then waveguide intersections at angles of less than about 15° must be avoided because such intersections increase signal coupling (crosstalk); and sharp bends must be avoided because of microbending loss. Positioning waveguide 440 in a different plane (perhaps above the plane that contains waveguide grating 430) would solve these problems, but fabrication costs increase.

Figure 5:
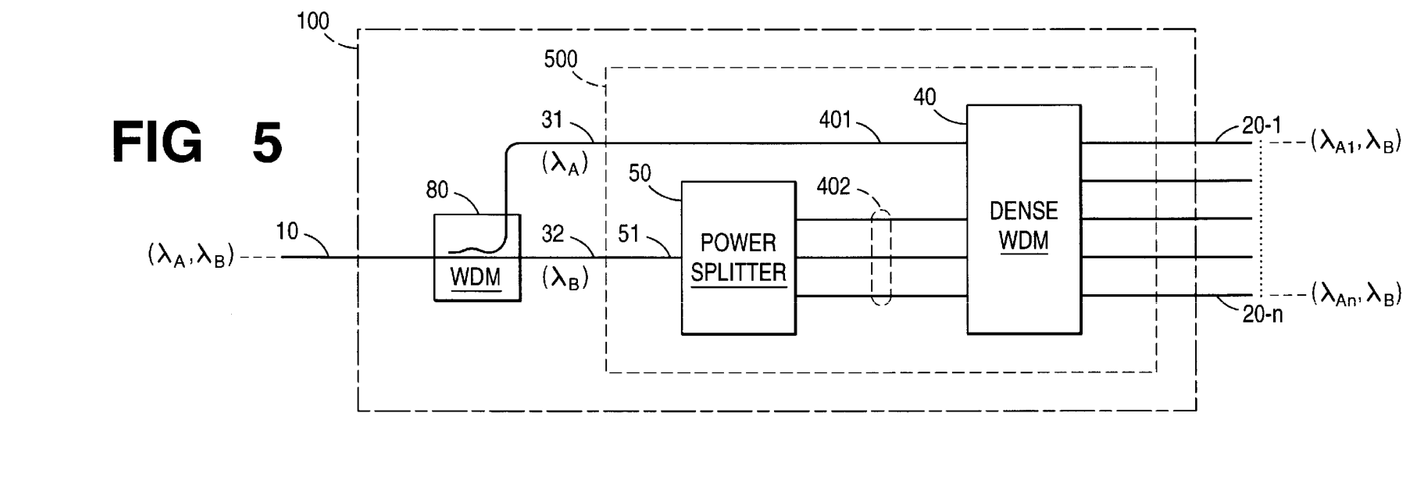
FIG. 5 discloses a functional block diagram of an optical multiplexer/demultiplexer according to the present invention.

The present invention is broadly disclosed in connection with FIG. 5 which discloses an optical multiplexer/demultiplexer 500, which is suitable for use in a 2P1 device 100. As discussed hereinbefore, optical signals in wavelength regions $\lambda_A$ and $\lambda_B$ are present on input waveguide 10. These optical signals are the split into two directions by coarse WDM 80 such that the $\lambda_A$ signals emerge on waveguide 31 and the $\lambda_B$ signals emerge on waveguide 32. The coarse WDM 80 used in the present invention is a waveguide filter based on Fourier expansion, and is hereinafter referred to as a Fourier filter. (Earlier designs of coarse WDMs have employed Mach-Zehnder interferometers, but they have a sinusoidal response, giving rise to strongly wavelength-dependent transmission and a narrow rejection band.) Fourier filter 80 comprises a chain of optical couplers of different effective lengths linked by differential delays of different lengths. The transfer function of the chain of couplers and delays is the sum of contributions from all possible optical paths, each contribution forming a term in a Fourier series whose sum forms the optical output. A desired frequency response is obtained by optimizing the lengths of the couplers and delay paths so that the Fourier series best approximates the desired response. Details regarding the design of Fourier filter 80 are disclosed in application Ser. No. 08/365,618 which was filed on Dec. 28, 1994 and is hereby incorporated by reference.

Dense WDM 40 includes at least two input ports: (1) port 401 receives optical signals in the $\lambda_A$ wavelength region for routing to individual output ports 20-1 . . . 20-n according to wavelength; and (2) port 402 receives optical signals in the $\lambda_B$ wavelength region for routing to all output ports 20-1 . . . 20-n. Note that port 402 comprises one or more waveguides whose cumulative width is critical to the present invention. Note also that the output from power splitter 50 connects directly to dense WDM 40. At this point, it is important to focus in somewhat greater detail on the operation of the dense WDM 40 because the cumulative width of the waveguides 402 at the output of power splitter 50 must be greater than the width of the Brillouin zone of the diffraction grating within the dense WDM. This is key to enabling the kB signal to be broadcast to all output ports 20-1 . . . 20-n. Accordingly, a brief discussion of dense WDMs is provided in connection with FIG. 6, although U.S. Pat. No. 5,136,671 is hereby incorporated by reference because it discloses the general design of such dense WDMs in greater detail. Additionally, a brief discussion of diffraction gratings and the Brillouin zone is provided in connection with FIG. 8.

Figure 6:
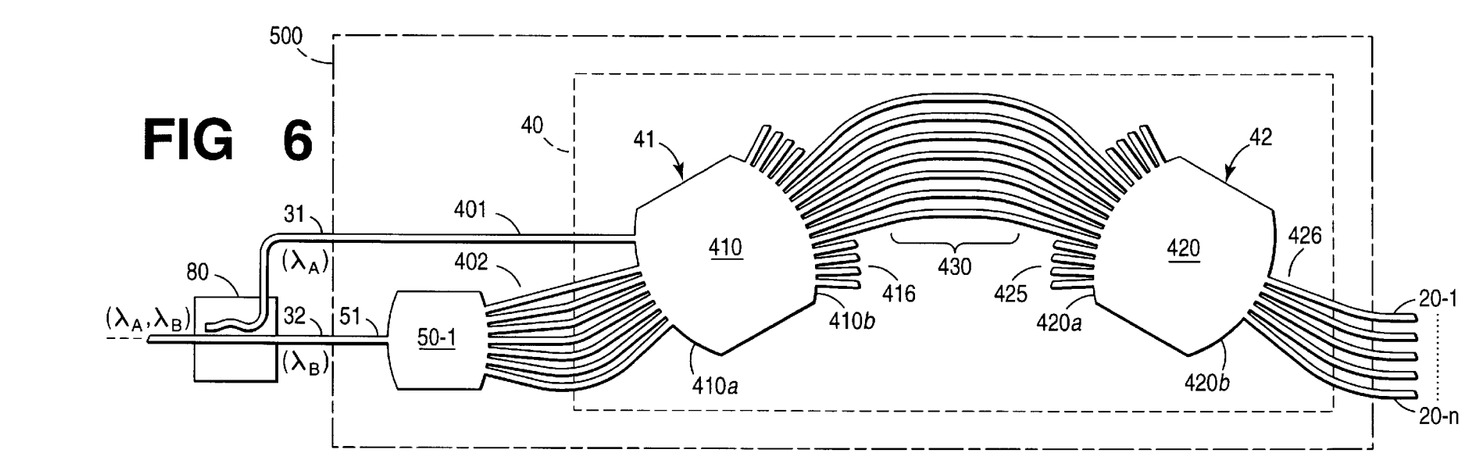
FIG. 6 discloses a first embodiment of the optical multiplexer/demultiplexer shown in FIG. 5.

FIG. 6 discloses a first specific embodiment of an optical multiplexer/demultiplexer 500 in which the generalized power splitter 50 of FIG. 5 is specifically shown to be a star coupler 50-1 having a single input port 51 and output ports comprising waveguides 402. The cumulative width of waveguides 402 is greater than the width subtended by the Brillouin zone as discussed below.

Star couplers split optical power entering any of its input ports among all of its output ports. Dense WDM 40 also utilizes star couplers 41, 42 which are interconnected by a number of unequal-length waveguides 430. Each coupler 41, 42 comprises a dielectric slab 410, 420 defining a free-space region between two periodic arrays of waveguides 416, 425, each radially directed toward a virtual focal point. The arrays are configured so that their respective foci are located at a predetermined distance away from and outside the free-space region to minimize phase errors caused by mutual coupling between adjacent waveguides.

Star coupler 41 includes a dielectric slab 410 which comprises a free-space region having two curved, preferably circular, boundaries 410a and 410b. Power transfer in star coupler 41, between input array 401–402 and output array 416, is accomplished through radiation in the dielectric slab 410. Such star couplers are constructed using SiOB technology, discussed above, to form dielectric slabs 410, 420 and their associated waveguide arrays on a single glass substrate. Star coupler 41 comprises a radially-directed array of input waveguides 401–402, and a radially-directed array of output waveguides 416. Each of these input and output ports is connected to the free-space region 410 in a substantially uniform fashion along boundaries 410a and 410b respectively. The length of each waveguide in the grating 430 differs from the lengths of all the other waveguides in the grating so that predetermined and different phase shifts are applied to optical signals propagating through the waveguides of the grating from the star coupler 41 because of the different path lengths over which the signals in the grating must travel to reach the output of the grating. Accordingly, the optical signals emanating from each of the waveguides of grating 430 have different phases, which are functions of the lengths of the waveguides.

The waveguides of grating 430 are connected to a radially directed array of input waveguides 425 of star coupler 42 which also includes an radially directed array of output waveguides 426. Similar to star coupler 41, star coupler 42 comprises a slab of dielectric material 420 forming a free-space region having two curved, preferably circular, boundaries 420a and 420b. Each of the input ports 425 and output ports 426 are connected to the free-space region 420 in a substantially uniform fashion along boundaries 420a and 420b respectively.

Figure 7:
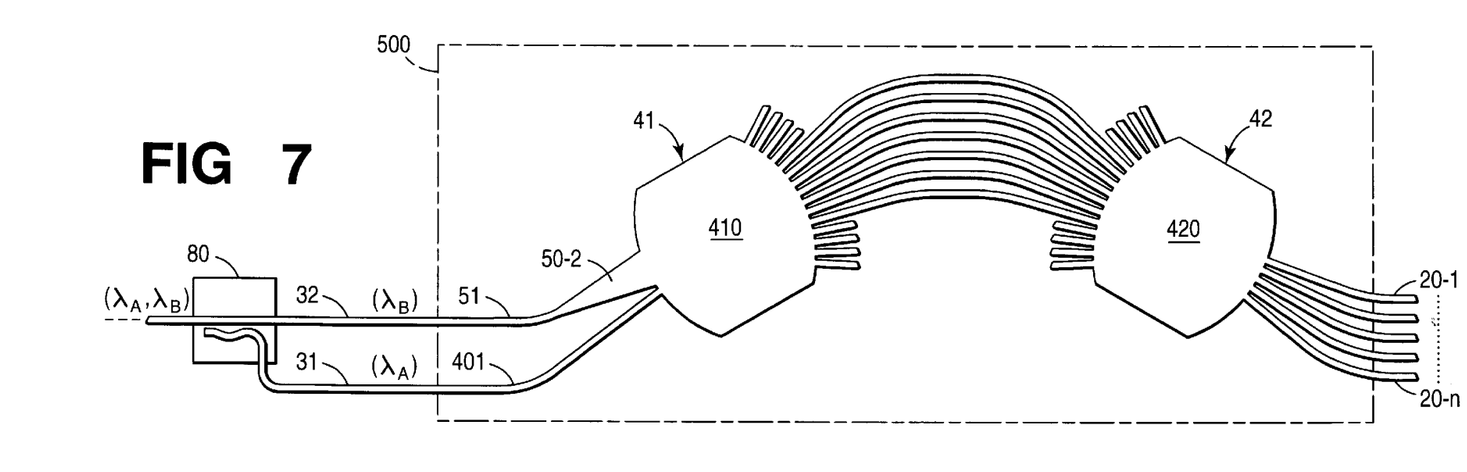
FIG. 7 discloses a second embodiment of the optical multiplexer/demultiplexer shown in FIG. 5.

FIG. 7 discloses a second specific embodiment of an optical multiplexer/demultiplexer 500 wherein the generalized power splitter 50 of FIG. 5 now comprises a waveguide 50-2 whose width tapers to a width ($w_1$) that is greater than the width ($w_2$) subtended by the Brillouin zone as discussed below. Similar to FIG. 5, a dense WDM comprising free-space regions 410, 420 is interconnected by a plurality of unequal-length waveguides 430. Fourier filter 80 is connected to the input of multiplexer/demultiplexer 500 to complete the construction of a 2P1 device 100. Optical input signals in $\lambda_A$ and $\lambda_B$ wavelength regions are split apart by the Fourier filter 80 and emerge on waveguides 31, 32 respectively.

Importantly, the optical signals to be broadcast (i.e., those in the $\lambda_B$ wavelength region) initially pass through tapered waveguide 50-2 so that the optical signals in the $\lambda_B$ wavelength region that emerge on each output port 20-1 . . . 20-n have approximately equal signal strength.

Diffraction Gratings

It is known that demultiplexing can be accomplished by transmitting a multiplexed signal through a diffraction grating, which separates the individual wavelengths of light and diffracts each in a slightly different direction. Multiplexing is accomplished by utilizing the same device in reverse (i.e., shining each wavelength through the grating at a predetermined wavelength-dependent angle such that all of the wavelengths emerge essentially as one single multiplexed beam of light). The function of a grating is integrated using an optical phased array constructed from a plurality of waveguides of various lengths. Each waveguide differs in length from its neighboring waveguide by a predetermined amount. The waveguides are substantially uncoupled throughout their entire lengths, except at their ends, where strong mutual coupling between the waveguides exists. The transition from the coupled portions to the uncoupled portions is gradual, resulting in negligible higher-order mode generation. A discussion of the operation of waveguide grating arrays is presented in U.S. Pat. No. 5,002,350.

Figure 8:
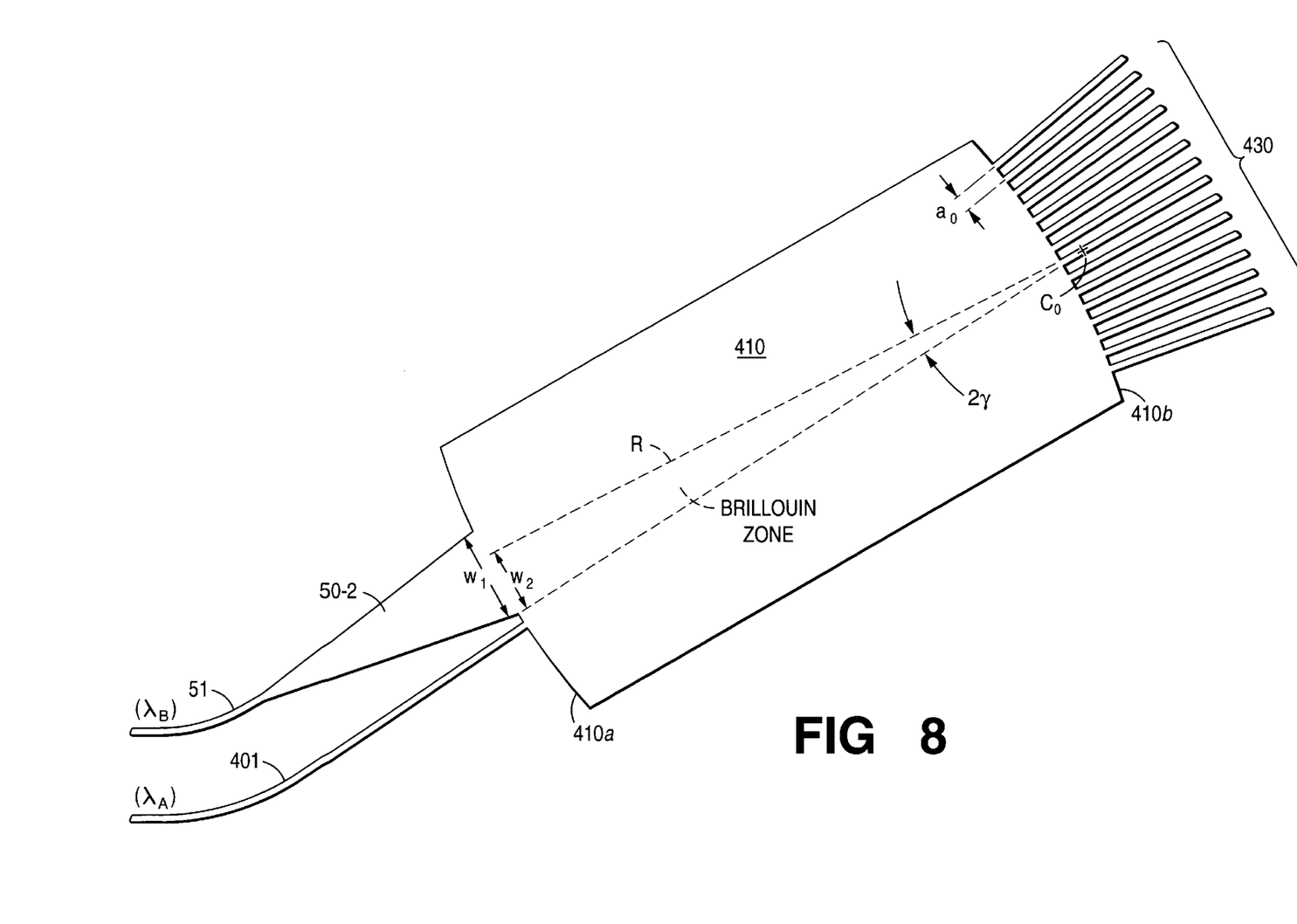
FIG. 8 is an enlarged view of a portion of the optical multiplexer/demultiplexer shown in FIG. 7.

Reference is finally made to FIG. 8 which provides a magnified view of the free-space region 410 shown in FIG. 7. FIG. 8 illustrates the relationship between the width ($w_1$) of power splitter 50-2 and the width ($w_2$) subtended by the central Brillouin zone. The Brillouin zone is associated with grating 430. Its angular dimension in radians is $2\gamma$, and $\gamma$ is jointly related to the wavelength ($\lambda$) of the incident light, the refractive index ($n_s$) of the slab, and the distance between waveguide centers ($a_0$) of the gratings 430 by the equation:

$$\sin \gamma = \lambda/2a_0 n_s$$

Since the width ($w_2$) subtended by the central Brillouin zone is a function of the wavelength of the incident light, and since this width is to be related to the width ($w_1$) of power splitter 50-2, which handles optical signals in the $\lambda_B$ wavelength region (i.e., signals that are broadcast to all output ports), then $\sin \gamma = \lambda_B/2a_0 n_s$. Additionally, since boundary 410a resides on the arc of a circle whose center is located at ($C_0$) which resides approximately on boundary 410b, and the distance from $C_0$ to boundary 410a is the radius (R) of that circle, then width ($w_2$) can be expressed by:

$$w_2 = 2\gamma R$$

where $\gamma$ is in radians

The following dimensions are for illustrative purposes only, and are not intended as limitations. Waveguides 31 and 32 have a generally square cross section and are approximately 5 $\mu$m on each side. Grating 430 comprises approximately one-hundred waveguides whose cross-section dimensions are about the same as waveguides 31, 32. Power splitter 50-2 has a length of about 1.0 centimeter (cm) and over this length its width gradually increases from about 5 $\mu$m to about 1.1 millimeters (mm).

$w_1 \approx 1.1$ mm;

$w_2 \approx 0.8$ mm;

$R \approx 1.0$ cm;

$2\gamma 0.08$ radians (5°); and $a_0 \approx 10$ $\mu$m

Although various particular embodiments of the present invention have been shown and described, modifications are possible within the spirit and scope of the invention. These modifications include, but are not limited to, the use of power splitters having different configurations, and operation at wavelengths other than about 1550 nm for $\lambda_A$ and about 1310 nm for $\lambda_B$. Additionally, although the disclosed embodiments are bi-directional, the present invention contemplates optical devices that are unidirectional.

I claim:

1. Optical multiplexing/demultiplexing apparatus (500) comprising a first star coupler (41) having at least two input waveguides (401, 402) and a plurality of output waveguides (416), said waveguides all being connected to a first free-space region (410);

a second star coupler (42) having a plurality of input waveguides (425), said waveguides all being connected to a second free-space region (420);

a grating (430) comprising a plurality of unequal-length waveguides that interconnect the output waveguides of the first star coupler to the input waveguides of the second star coupler, said grating being suitable for multiplexing and demultiplexing optical signals in a first wavelength region ($\lambda_A$), said grating having a central Brillouin zone angle ($2\gamma$) associated therewith that is related to the wavelength ($\lambda$) of incident light; and a power splitter (50), responsive to optical signals in a second wavelength region ($\lambda_B$), which is disjoint from the first wavelength region, having one or more output waveguides connected in series with the input waveguides of the first star coupler, said one or more waveguides having a cumulative width ($w_1$) which is greater than the width ($w_2$) subtended by the central Brillouin zone.

2. The optical multiplexing/demultiplexing apparatus (500) of claim 1 wherein the power splitter (50) comprises a third star coupler (50-1) having an input waveguide (51), and a plurality of output waveguides connected to the input waveguides (402) of the first star coupler (41).

3. The optical multiplexing/demultiplexing apparatus (500) of claim 1 wherein the power splitter (50) comprises a tapered waveguide (50-2), whose width gradually increases along its length.

4. The optical multiplexing/demultiplexing apparatus (500) of claim 1 wherein the grating (430) routes optical signals in the first wavelength region from one of the input waveguides (401) of the first star coupler (41) to individual output waveguides (20-1 . . . 20-n) of the second star coupler (42) according to wavelength, and wherein the grating routes optical signals in a second wavelength region, which is disjoint from the first wavelength region, from the other input waveguide (402) of the first star coupler to all output waveguides of the second star coupler.

5. The optical multiplexing/demultiplexing apparatus (500) of claim 4 wherein the first wavelength region includes 1550 nanometers, and wherein the second wavelength region includes 1310 nanometers.

6. The optical multiplexing/demultiplexing apparatus (500) of claim 4 further including a coarse wavelength-division multiplexer (80) for routing input optical signals in the first and second wavelength regions to different output ports thereof, the optical signals in the first wavelength region being routed to said one of the input waveguides (401) of the first star coupler (41), and the optical signals in the second wavelength region being routed to the power splitter (50).

7. The optical multiplexing/demultiplexing apparatus (500) of claim 6 wherein the coarse wavelength-division multiplexer (80) comprises a Fourier filter.

8. An optical multiplexer/demultiplexer (500) comprising first and second star couplers (41, 42) that are interconnected by a grating (430), the grating having a Brillouin zone associated therewith, said multiplexer/demultiplexer functioning to distribute optical signals in a first wavelength region ($\lambda_A$) from one input port (401) of the first star coupler (41) to individual output ports (20-1 . . . 20-n) of the second star coupler (42) according to wavelength,

CHARACTERIZED IN THAT the first star coupler further includes one or more other input ports (402) for receiving optical signals in a second wavelength region ($S\lambda_B$) and distributing same to all output ports of the second star coupler, said first and second wavelength regions being disjoint from each other; and a power splitter (50) having an input port (51) and one or more output ports connected in series with said one or more other input ports of the first star coupler, the output ports of the power splitter having a cumulative width ($w_1$) that is greater than the width ($w_2$) subtended by the central Brillouin zone.

9. The optical multiplexer/demultiplexer (500) of claim 8 wherein the power splitter (50) comprises a third star coupler (50-1) whose output ports are connected to the input ports (402) of the first star coupler (41).

10. The optical multiplexer/demultiplexer (500) of claim 8 wherein the power splitter (50) comprises a single tapered waveguide (50-2).

11. The optical multiplexing/demultiplexing apparatus (500) of claim 8 further including a coarse wavelength-division multiplexer (80) for routing input optical signals in the first and second wavelength regions to different output ports thereof, the optical signals in the first wavelength region being routed to said one of the input waveguides (401) of the first star coupler (41), and the optical signals in the second wavelength region being routed to the power splitter (50).

12. Optical apparatus (100), having a single input port (10) and a plurality of output ports (20-1 . . . 20-n), for routing optical signals in a first-wavelength region ($\lambda_A$) from the input port to respective individual output ports according to wavelength and routing optical signals in a second wavelength region ($\lambda_B$) from the input port to all output ports, the first and second wavelength regions being disjoint from each other, the apparatus including a dense wavelength-division multiplexer (WDM) (40) having at least two input ports (401, 402), said dense WDM having a central Brillouin zone associated therewith which subtends a width ($w_2$), the apparatus further including a coarse WDM (80) having a pair of output ports (31, 32), one of said output ports (31) of the coarse WDM connecting optical signals in the first wavelength region to an input port (401) of the dense WDM

CHARACTERIZED IN THAT the other of said output ports (32) of the coarse WDM connects optical signals in the second wavelength region to an optical power splitter (50), which is series connected to the other input ports (402) of the dense WDM; and the optical power splitter includes one or more output waveguides having a cumulative width ($w_1$) which is greater than the width ($w_2$) subtended by the central Brillouin zone.

13. The apparatus (100) of claim 12 wherein the dense WDM (40) comprises a pair of star couplers (41, 42) interconnected by a plurality of unequal-length waveguides (430).

14. The apparatus (100) of claim 13 wherein the power splitter (50) comprises a third star coupler (50-1) having an input waveguide (51), and a plurality of output waveguides connected to the input waveguides (402) of the first star coupler (41).

15. The apparatus (100) of claim 13 wherein the power splitter (50) comprises a single waveguide (50-2), whose width gradually increases along its length.

16. The apparatus (100) of claim 12 wherein the first wavelength region includes 1550 nanometers, and wherein the second wavelength region includes 1310 nanometers.

17. The apparatus (100) of claim 12 wherein the coarse wavelength-division multiplexer (80) comprises a Fourier filter.

* * * * *